JAMES M. EVARTS.
Improvement in Corn Huskers.
No. 124,486. Patented March 12, 1872.
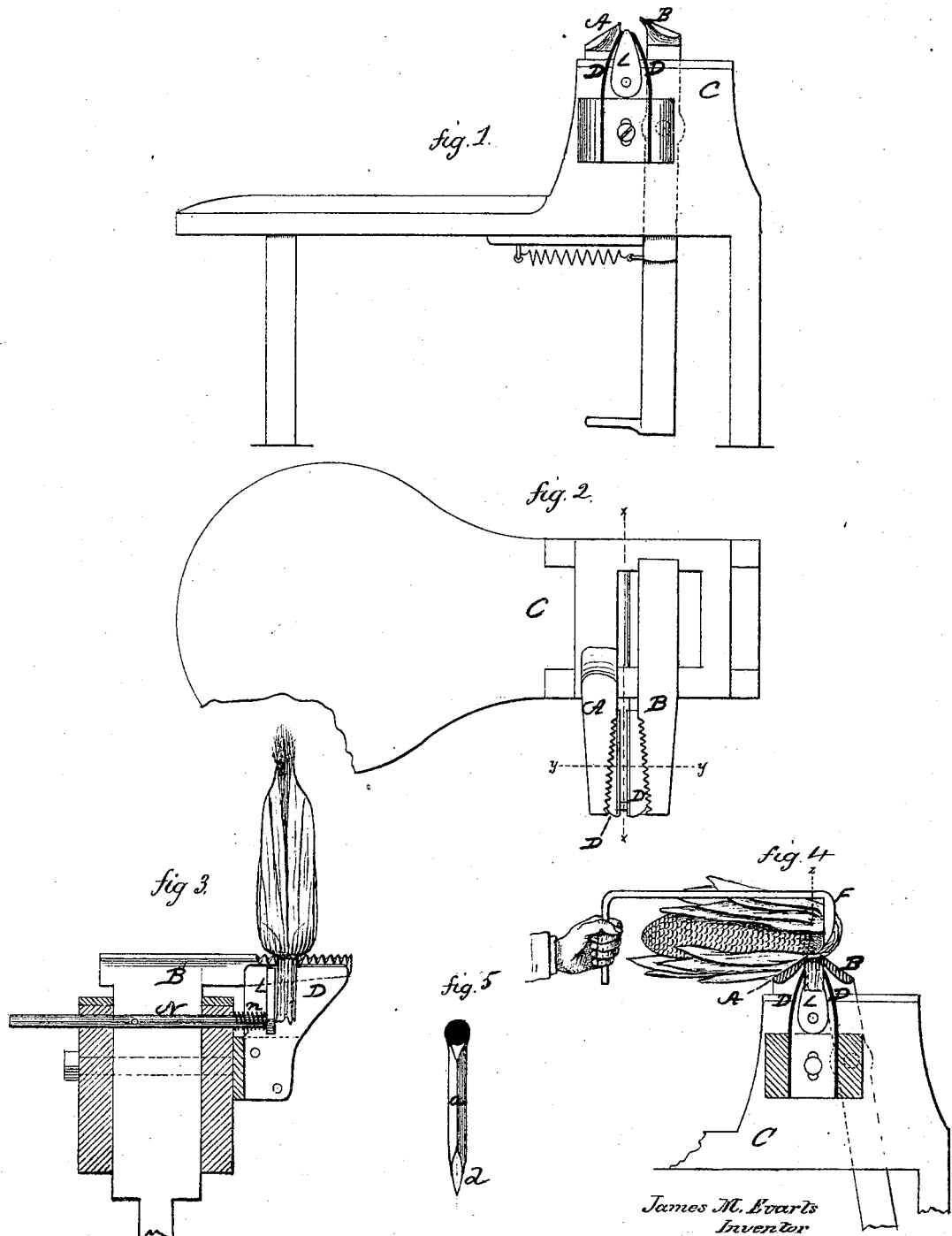
James M. Evarts
Inventor
By his Atty.

UNITED STATES PATENT OFFICE.

JAMES M. EVARTS, OF NEW HAVEN, CONNECTICUT.

IMPROVEMENT IN CORN-HUSKERS.

Specification forming part of Letters Patent No. 124,486, dated March 12, 1872.

*To all whom it may concern:*

Be it known that I, JAMES M. EVARTS, of New Haven, in the county of New Haven and State of Connecticut, have invented a new Improvement in Corn-Husker; and I do hereby declare the following, when taken in connection with the accompanying drawing and the letters of reference marked thereon, to be a full, clear, and exact description of the same, and which said drawing constitutes part of this specification and represents, in—

Figure 1, a side view; Fig. 2, a top view; Fig. 3, a longitudinal section through the jaws on line $x\,x$, to illustrate the operation; Fig. 4, a transverse section on line $y\,y$; and in Fig. 5, a sectional view of the discharging device on line $z\,z$.

This invention relates to a device for husking corn, the object being to discharge the corn from the husks without separating the husks from the stalks; and it consists in a pair of grasping-jaws combined with elastic jaws, to serve as a guide for the stalk, whereby the stalk is introduced below the jaws, and the ear and its husks remain above; also, in a peculiar-formed hook for drawing the ear from the husks, as more fully hereafter described.

A is a fixed jaw; B, a movable jaw, arranged upon any suitable bench or platform? C, the said movable jaw arranged to swing to or from the fixed jaw, and the edges of the jaw roughened or otherwise prepared to take a firm hold. Beneath these jaws are arranged two elastic plates, D D, corresponding in position to the jaws A B, as denoted in Figs. 1 and 2. The corn-stalk is passed between the open jaws A B and between the elastic plates D D, the ear and its husks being above and the stalk and its leaves below, the elastic plates D D holding the leaves or other parts of the stalk, and they also serve as a guide for the proper insertion of the ear. Properly inserted, as in Fig. 3, the two jaws are pressed together, grasping the stalk close up to the ear; then the operator breaks down the ear, as in Fig. 4, separating the ear at its base from the stalk, the ear remaining in the husks. These may be separated by the fingers of the operator, but is greatly facilitated by the use of a hook, F, as seen in Fig. 4, this hook, constructed as in Fig. 5, having a sharp edge, $a$, and a blunt point, $d$. The operator presses this hook down through the husks in the rear of the ear, as in Fig. 4, the blunt end $d$ bearing against the ear, and draws the hook forward. The edge $a$ cutting through the husks, the ear is drawn out without necessarily opening the husks any further than is done by the hook. To throw the stalks and husks from the machine after the ear is separated, I arrange a follower, L, upon a shaft, N, upon which acts a spring, $n$, the tendency of which is to throw the follower forward. When the stalk is inserted, the follower is pressed back, as in Fig. 3; then, when the jaws are open, the spring throws the follower out, discharging the stalk and husks from the machine.

I claim as my invention—

1. In combination with the jaws A B, one stationary and the other movable, and the elastic plates D D, I claim the follower L, having a movement parallel with the said jaws, and working between the said plates, substantially in the manner and for the purpose specified.

2. The independent discharging-hook F, having its end $a\,d$ constructed as described, and to operate as and for the purpose set forth.

JAMES M. EVARTS.

Witnesses:
JOHN H. SHUMWAY,
A. J. TIBBITS.